United States Patent [19]

Landheer et al.

[11] 4,254,424

[45] Mar. 3, 1981

[54] ELECTROSTATIC RECORDING APPARATUS

[75] Inventors: Dolf Landheer, Toronto, Canada; Shy-Shung Hwang, Penfield, N.Y.; Charles Nesta, Rochester, N.Y.; Gino F. Squassoni, Pittsford, N.Y.

[73] Assignee: Xerox Corporation, Stamford, Conn.

[21] Appl. No.: 45,359

[22] Filed: Jun. 4, 1979

[51] Int. Cl.$^{3}$ ....................... G01D 15/16; G01D 15/24

[52] U.S. Cl. ................................. 346/139 C; 346/1.1; 346/155; 346/136

[58] Field of Search ................ 346/139 C, 155, 1, 136

[56] References Cited

U.S. PATENT DOCUMENTS

| | | | |
|---|---|---|---|
| 2,959,636 | 11/1960 | Lemelson | 346/139 C |
| 4,124,854 | 11/1978 | Kirtikar | 346/139 C X |
| 4,137,536 | 1/1979 | Hinz et al. | 346/155 |
| 4,168,506 | 9/1979 | Corsover | 346/136 X |

FOREIGN PATENT DOCUMENTS

| | | | |
|---|---|---|---|
| 744197 | 2/1956 | United Kingdom | 346/136 |

*Primary Examiner*—George H. Miller, Jr.

[57] ABSTRACT

The present disclosure is directed to electrostatic recording devices wherein a latent electrostatic image is recorded on a dielectric coated sheet by a stylus array spaced apart from the sheet to form an ionization gap. There is now taught a means to accurately establish the distance between the recording stylus and the dielectric surface upon which the latent image is created. A dielectric sheet containing a conductive layer is passed over a fixed recording head containing an array of styli. The fixed recording head is provided with a source of fliuid which maintains positive pressure in a cavity with the recording head, which cavity has outlets facing the dielectric sheet passing over the head. The length of the gap between the dielectric sheet and the recording head is maintained by the fluid pressure emanating from the head.

10 Claims, 5 Drawing Figures

ELECTROSTATIC RECORDING APPARATUS

The invention relates to an apparatus for the electrostatic recording of latent electrostatic images on a dielectric web. More particularly, the invention relates to a means for maintaining a constant air gap length between the dielectric web and a recording head containing an array of styli.

BACKGROUND OF THE INVENTION

Electrostatic recording devices utilizing dielectric webs in an array of electrodes, generally termed the recording styli, are well known. The principal of operation of main concern with respect to this invention is the creation of a latent electrostatic image on the dielectric web by means of raising individual stylus in the recording head to a sufficient electrical potential so as to ionize the air in the gap between the head and the dielectric web. Since the distance between the web and the recording styli is the most critical factor as to the amount of potential required for the ionization to take place, the maintenance of a constant distance remains a primary objective in the prior art.

The large majority of the prior art relating to the problem of bringing a recording head into proximity with a dielectric substrate relates to mechanical methods, sometimes augmented with electrical control so as to adjust the stylus. In some instances, the wear of the stylus is compensated by the movement of the web to be charged. Mechanical means to sense the distance between the stylus and the dielectric substrate are taught. Such prior art is represented by U.S. Pat. No. 2,850,350; U.S. Pat. No. 3,816,839; and U.S. Pat. No. 3,846,802. In all of this prior art, the problem of maintaining mechanical devices replaces the primary problem of the distance between the web and the dielectric surface.

In a different attempt to achieve a constant distance between the recording head and a dielectric web, there is taught the use of an air bearing or fluid cushion in U.S. Pat. No. 4,124,854. According to this patent, the recording head is provided with a chamber having outlets adjacent the recording styli. Compressed air is fed to the chamber and permits the head to float upon the compressed air released through the outlets. The dielectric web is maintained at a constant location by passing it over a fixed support. By utilizing an electrically conductive support, a ground element for the electrical circuit is also provided. While this approach greatly simplifies the solution of the problem, there remains the problem of the lateral consistency of the distance between the dielectric web and the multiple styli head across the entire width of the head and dielectric sheet.

BRIEF DESCRIPTION OF THE INVENTION

It is an object of this invention to provide a means of accurately controlling the distance between a recording head containing a multiplicity of recording styli and a continuous dielectric web.

Another object of this invention is to provide and electrostatic recording device which greatly simplifies the electrostatic recording of latent images on a dielectric coated sheet.

These and other objects of this invention will be apparent upon a reading of the following description.

In accordance with this invention there is provided an electrostatic recording apparatus and method for recording information on a dielectric web comprising an electrically conductive layer and a thin dielectric layer overlying the conductive layer. The web is passed over but out of contact with a fixed electrostatic recording head having means for selectively applying a voltage between the stylus and the conductive layer in the web of sufficient magnitude to create ionization in the gap. The head is held in a fixed position and is provided with means for maintaining a minimum predetermined distance between the stylus and the web which means includes a means for producing a fluid flow between the head and the dielectric web to create a fluid cushion for supporting the web as it passes over the styli.

The invention will be further described in conjunction with the accompanying drawings although variations and modifications may be effected without departing from the spirit and scope of the present invention.

DETAILED DESCRIPTION OF THE DRAWINGS

Figure 1:
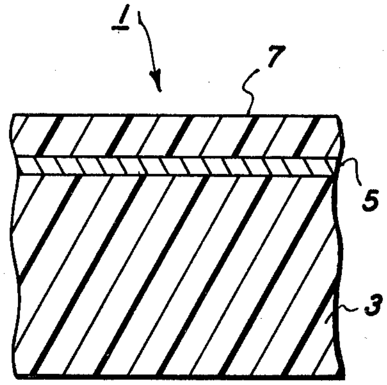
FIG. 1 is a cross-sectional view of a dielectric web utilized in the device and method of this invention.

FIG. 1 is a cross-sectional view of the dielectric web utilized in the device and process of this invention. The dielectric web designated generally as 1, comprises three basic components. A substrate 3 provides mechanical strength for the web to be processed through the necessary machinery in any electrostatic recording process proposed. Substrate 3 is advantageously a high strength organic polymer because of its availability and ease of manufacture. However, substrate 3 can be of any suitable material including electrically conductive or electrically insulating substrates. Typical materials include filmforming polymers such as the polyolefins, polyesters, polystyrenes, polycarbonates, and polyethylene terephthalate which is preferred because of its availability and structural stability.

Over substrate 3 there is applied a thin conductive layer 5 which provides the electrode in the electrical circuit opposite the recording stylus. Such layer is typically in the range of from about 1 to about 5 microns in thickness and can utilize any electrically conductive material. Such materials include most metals and their conductive oxides, electrically conductive organic polymers such as polysulfones, polymer resins and metal foils. Since the electrode is generally grounded, one usually constructs web 1 by extending conductive layer 5 beyond the boundries of the other layers in the web so that it can easily be contacted with conductive material included in the electrical circuit of the recording apparatus.

Conductive layer 5 is covered by dielectric layer 7 upon which is placed the electrostatic charges caused by ionization of the air between layer 7 and the recording stylus. Dielectric layer 7 is typically an organic polymer of sufficient dielectric strength and thickness to hold an electrostatic charge at least for a period of time needed to either develop and transfer an image therefrom or to otherwise detect the latent image created by the charge deposition. Although dependent upon the dielectric strength of the material utilized in layer 7, the layer is preferably maintained rather thin such as in the range of from about 5 microns to 15 microns and typically in the range of about 10 microns. Materials useful in construction of layer 7 are inorganic dielectric coatings such as aluminum oxide, non-conducting polymers such as polytetrafluoromethylene, polycarbonates, polyesters, polyolefins, acrylics and polymer compositions containing additives to improve the mechanical properties of the layer.

In some instances, substrate 3, which is typically in the range of about 100 microns in thickness, is transparent to electromagnetic radiation. In this event, the web can be employed in a system which utilizes illumination of the dielectric web adjacent the recording stylus through the substrate 3 and conductive layer 5. In some instances, such illumination may aid in the initiation of the stylus discharge.

Figure 2:
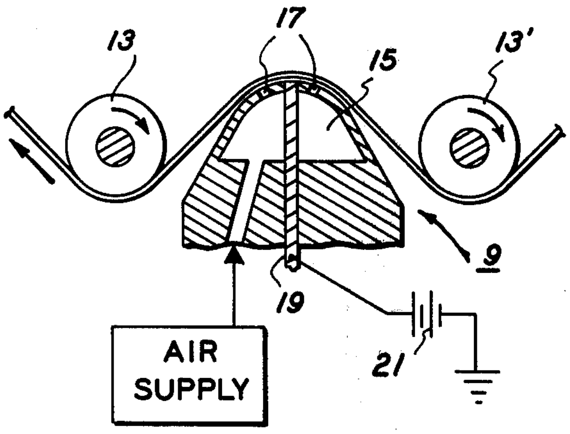
FIG. 2 is a cross-sectional view of the recording head of this invention and a dielectric web as it passes the recording head at a predetermined distance.

In FIG. 2 there is shown a cross-sectional view of recording head, generally shown as 9, and an associated means for supplying the head with a fluid, generally designated 11. As indicated in FIG. 2, web 1 passes adjacent recording head 9 and is tensioned by rollers 13 and 13'. Within head 9 there is provided a fluid chamber 15 having outlets 17. By properly spacing outlets 17, web 1 rides upon a cushion of fluid emanating from outlets 17 and is held at a constant distance from recording head 9 by a balance of the tension force on web 1 and the pressure of fluid from outlets 17.

While FIG. 2 is a cross-sectional view, one can easily envision an extended recording head running the width of web 1 having a multiplicity of recording styli having adjacent thereto sufficient outlets 17 to provide a flow of fluid to maintain a constant gap across the width of the sheet. As indicated in FIG. 2, stylus 19 is associated with power source 21 which provides an electrical potential sufficient to raise the potential on the stylus above the grounded conductive layer 5 in web 1 so as to create ionization of the air and the charges on web 1.

As indicated in FIG. 2, head 9 is desirably rounded in the area of the recording stylus and outlets to air chamber 15. A flexible web moving over the surface of head 9 is a self-acting foil bearing. In combination with the fluid emitted from the outlets 17, there is provided, in accordance with this invention, a combination air bearing and foil bearing.

Among the advantages of the device of this invention is the simplicity of construction and the achievement of consistent spacing across the width of the web. In the present device, the recording head is stationary at a fixed point. As is indicated in FIG. 2, there is no support for the dielectric web as the web passes recording head 9. Thus, there is no mechanical adjustment required for the control of the space between web 1 and head 9. Further, the variation in thickness of web 1 across the width is automatically compensated by the fact that web 1 is flexible and can be moved either toward or away from head 9 along its width at any time. The ability of web 1 to flex permits the maintenance of the pressure of the fluid emitted by head 9 to remain constant across the width of web 1. As web 1 becomes thicker in one area, it can move away from the head in that portion wherein the thickness has increased while the remainder of the web remains in place. A support behind web 1 at the closest point to head 9 would not permit lateral flexibility of web 1 and any thickness variation across the width of web 1 would result in an averaging of the distance between web 1 and head 9 in order to keep the pressure constant.

Figure 3:
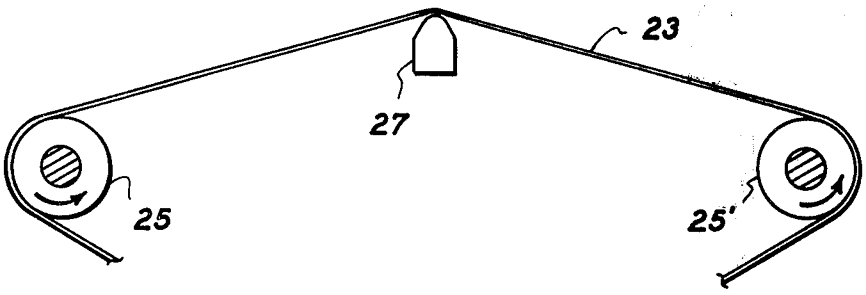
FIG. 3 is an alternative means for bringing the dielectric web into proximity with the recording head in accordance with this invention.

In FIG. 3, there is shown another embodiment of this invention. In this embodiment, a continuous web 23 having the same cross-section as indicated in FIG. 1 is supported by rollers 25 and 25'. Fluid pressure emitted through head 27 maintains the web at a constant distance from the head in the same manner as is shown in FIG. 2. The fluid pressure exerted is typically in the range of about 0.5 to about 20 pounds per square inch, preferably between about 0.8 to about 2 pounds per square inch. The drive mechanism for continuous web 23 is not shown in this embodiment but such drive mechanisms are well known and may include rollers 25 and 25'. As in FIG. 2, the conductive layer 5 of web 1 is grounded in the electrical circuit which includes the stylus head 27.

In a device utilizing a continuous web, such as is shown in FIG. 3, the latent electrostatic image is transferred to a second substrate or, alternatively, the latent image on continuous web 23 is developed with powder material and the visible image is transferred to another substrate. Web 23 is then cleaned and the latent image erased when the latent image is no longer needed. In such process utilizing a continuous web, the latent image can be employed to develop multiple images by successive development and transfer depending upon the length of time the latent image resides upon web 23 without significant decay. The transfer of either the latent image or developed image can be performed in typical prior art fashion. The latent image on web 23 can be erased by typical prior art methods, such as by charging the web by means of an A.C. corona discharge device biased to zero potential.

DESCRIPTION OF THE PREFERRED EMBODIMENTS

The following examples further specifically illustrate the present invention and are not intended to limit the invention in any way.

EXAMPLE I

A charging head is prepared as illustrated in FIG. 2. Two rows of staggered orifices having a diameter of 0.005 inch are drilled through the head on each side of the stylus into an air chamber within the head. The distance between the two rows is 0.12 inch and the space between the orifices in each row is about 0.3 inch, center to center. The radius of the head is ground to about 2.7 inches. The head is mounted along the path of a conductive web having a thickness of about 0.001 inch comprising a film of polyethylene teraphthalate which has been coated on the side opposite the head with a thin conductive film of aluminum. The web is transported over the head in a manner illustrated in FIG. 3 with a web speed of 3.5 inches per second.

The space maintained between the web and the head is measured with a Wayne Kerr capacitance transducer (DIMEQ TE 200) with a Mechanical Technology, Inc. probe (CP1). The distance as measured by the transducer and probe are calibrated with a micrometer and found to be linear and accurate.

Figure 4:
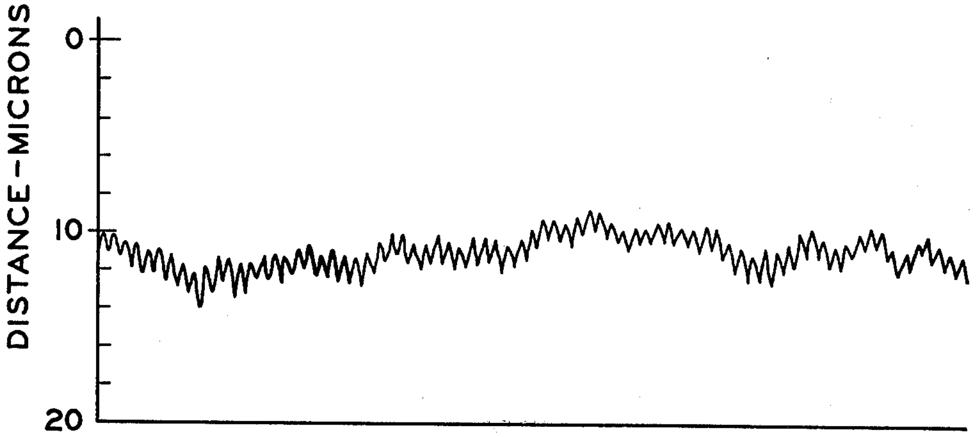
FIGS. 4 and 5 are graphs constructed by the chart recorder.

With a supply of air into the chamber of the head at a pressure of 0.8 p.s.i., the web is driven past the head whereby the air pressure maintains a space between the head and the web of about 11 microns with a variation of 2 microns. A graph constructed by a chart recorder connected to the transducer is presented in FIG. 4. As is indicated by FIG. 4, the distance between the head and the web is maintained in the range of about 11 microns with a variation of about 2 microns. The vibration frequency is about 40.5 cycles/sec.

EXAMPLE II

Figure 5:
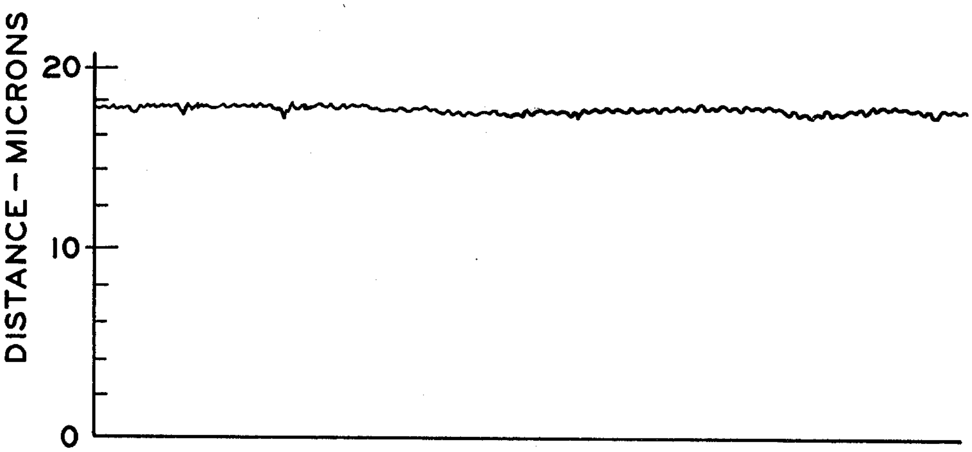

In FIG. 5, there is presented a graph obtained as in the above example with the exception that the air pressure in the recording head is raised to 0.95 p.s.i. The distance between the web and the recording head is about 17.2 microns with a variation of ±0.5 microns. The vibration frequency remains the same as above. A comparison of FIGS. 4 and 5 indicates that as the fluid pressure is increased, the vibration and the variation is reduced.

The above Examples illustrate the invention in conjunction with a smooth surfaced dielectric web or belt. This is in contrast with the earliest attempts to maintain the gap between the styli and the dielectric sheet through the use of rough surfaced dielectric sheets. In the earlier method, the recording styli contacted the upper points of the surface thereby creating a gap between the styli and the lower points on the surface at an average gap of the correct distance to create ionization. In such a system, the styli wore down with use and if one attempts to use a rough surface continuous web, the web wears excessively. In addition, transfer of the developed image is difficult.

In accordance with this invention, smooth surfaced dielectric webs can be utilized since there is no contact required between the web and the recording styli. Transfer of the developed image from the smooth surfaced dielectric belt is not difficult and thus there is provided a method whereby a continuous belt is utilized as the dielectric web wherein the latent electrostatic image is developed and transferred to another substrate in a cyclic system. Cleaning the electric web is facilitated by the smooth surface. In a system wherein the smooth surfaced dielectric surface is the final image substrate, images of superior quality are obtainable, particularly with respect to resolution.

The invention herein described is not restricted to the specific embodiments set forth but is adaptable to use with any conducting stylus material and suitable fluid supply. Since certain other changes may be made in the above apparatus without departing from the scope of this invention herein set forth, it is intended that all matter contained in the above description and shown in the accompanying drawings shall be interpreted as illustrative and not in a limiting sense.

What is claimed is:

1. An electrostatic recording apparatus for recording information on a dielectric web comprising an electrostatic recorder head including a stylus having a tip in a fixed position; means for directing a web in proximity to said recorder head, said web comprising a dielectric surface facing said recorder head and a conductive layer; means for maintaining a distance between said head and said web, said means comprising a fluid chamber within said head having fluid outlets comprising orifices adjacent said stylus, including means for producing a fluid flow between said head and web to create a fluid cushion for supporting said web; and means for selectively applying a voltage between said stylus and the conductive layer in said web; said voltage being of sufficient magnitude to create ionization across said distance.

2. The apparatus of claim 1 wherein the means for directing said web comprises a pair of rollers.

3. The apparatus of claim 1 wherein said web is a continuous web.

4. The apparatus of claim 1 wherein said web is discontinuous.

5. The apparatus of claim 1 wherein said means for producing a fluid flow comprises a source of compressed air connected to a chamber within said recorder head.

6. A method of adjusting the gap between a stylus tip in a recording head and a web being moved passed said head which comprises providing a fluid chamber in said head associated with a supply of fluid and outlets in said head comprising orifices adjacent said stylus to provide a means for emitting fluid from said fluid chamber toward said web whereby the web is maintained at a predetermined distance from the head.

7. The method of claim 6 wherein the fluid supply is air under pressure.

8. The method of claim 7 wherein the air pressure is in the range of from about 0.5 to about 20 pounds per square inch.

9. A method of selectively applying electric charge to a dielectric web which comprises providing a dielectric web having a dielectric surface coated upon an electrically conductive layer;

providing an electrostatic recording head comprising a stylus and a fluid chamber within said head, said chamber associated with a supply of fluid and wherein the chamber is provided with outlets comprising orifices adjacent said stylus;

providing an ionizing voltage to said stylus while grounding said conductive layer; and supplying said fluid chamber with fluid whereby said fluid is emitted through said outlets and maintains a gap between the web and the recording head.

10. The method of claim 9 wherein the fluid is air.

* * * * *